United States Patent
LaRue et al.

(10) Patent No.: US 12,336,462 B2
(45) Date of Patent: Jun. 24, 2025

(54) PEST AND DISEASE MANAGEMENT SYSTEM FOR USE WITH A CROP IRRIGATION SYSTEM

(71) Applicant: Valmont Industries, Inc., Omaha, NE (US)

(72) Inventors: Jacob L. LaRue, Owasso, NE (US); Daniel J. Burgard, Spokane Valley, WA (US)

(73) Assignee: Valmont Industries, Inc., Omaha, NE (US)

( * ) Notice: Subject to any disclaimer, the term of this patent is extended or adjusted under 35 U.S.C. 154(b) by 377 days.

(21) Appl. No.: 17/862,785

(22) Filed: Jul. 12, 2022

(65) Prior Publication Data

US 2022/0354073 A1 Nov. 10, 2022

Related U.S. Application Data

(63) Continuation-in-part of application No. 17/095,885, filed on Nov. 12, 2020, now Pat. No. 11,246,273.

(60) Provisional application No. 62/945,268, filed on Dec. 9, 2019.

(51) Int. Cl.
| | | |
|---|---|---|
| *A01G 25/16* | (2006.01) | |
| *A01G 25/09* | (2006.01) | |
| *B64D 1/18* | (2006.01) | |
| *B64U 101/40* | (2023.01) | |
| *B64U 101/45* | (2023.01) | |
| *G05B 19/042* | (2006.01) | |

(52) U.S. Cl.
CPC ......... *A01G 25/167* (2013.01); *A01G 25/092* (2013.01); *B64D 1/18* (2013.01); *G05B 19/042* (2013.01); *B64U 2101/40* (2023.01); *B64U 2101/45* (2023.01); *G05B 2219/2625* (2013.01)

(58) Field of Classification Search
CPC ...... A01G 25/167; A01G 25/092; B64D 1/18; G05B 19/042; G05B 2219/2625; B64U 2101/40; B64U 2101/45
See application file for complete search history.

(56) References Cited

U.S. PATENT DOCUMENTS

| | | | |
|---|---|---|---|
| 10,796,150 B2 | 10/2020 | Ganssle | |
| 11,477,935 B1* | 10/2022 | Muehlfeld | A01M 7/0089 |
| 2014/0012732 A1* | 1/2014 | Lindores | A01B 79/005 |
| | | | 705/37 |
| 2016/0366842 A1* | 12/2016 | Guy | A01G 25/167 |
| 2022/0065835 A1* | 3/2022 | Shore | G06V 20/188 |

OTHER PUBLICATIONS

U.S. Appl. No. 15/447,814, Titled: Automated Diagnosis and Treatment of Crop Infestations, filed Mar. 2, 2017, 73 pages.
U.S. Appl. No. 17/139,511, Titled: Automated Diagnosis and Treatment of Crop Infestations, filed Dec. 31, 2020, 60 pages.

* cited by examiner

*Primary Examiner* — Chad G Erdman
(74) *Attorney, Agent, or Firm* — Milligan PC LLO

(57) ABSTRACT

A system and method for determining specific prescriptions for targeted areas/plants within given irrigation areas. According to preferred embodiments, the system may use imaging data in combination with other sensors and analysis modules to identify selected pests and diseases affecting given crops. Preferably, the system may use machine learning/AI modules to analyze the data and to provide targeted prescriptions for targeted groups of identified crops based on identified conditions of infestation and/or disease within the identified crops.

14 Claims, 9 Drawing Sheets

PEST AND DISEASE MANAGEMENT SYSTEM FOR USE WITH A CROP IRRIGATION SYSTEM

RELATED APPLICATIONS

The present application is a Continuation-In-Part of U.S. patent application Ser. No. 17/095,885 filed Nov. 12, 2020, (now U.S. Pat. No. 11,246,273) which claims priority to U.S. Provisional Patent Application No. 62/945,268 filed Dec. 9, 2019. The present application further claims priority to U.S. patent application Ser. No. 16/169,115 filed Oct. 24, 2018 (now U.S. Pat. No. 10,631,477) which claims priority to U.S. Provisional Application No. 62/578,688 filed Oct. 30, 2017. The present application further claims priority to U.S. Provisional Patent Application No. 63/226,785, filed Jul. 29, 2021. Each of these applications share a common inventor and are commonly owned.

BACKGROUND AND FIELD OF THE PRESENT INVENTION

Field of the Present invention

The present invention relates generally to a pest and disease management system. More particularly, the present invention relates to a system, method, and apparatus for providing full integration of field, crop and irrigation equipment data for pest and disease management.

Background of the Invention

Modern field irrigation machines most often include an overhead sprinkler irrigation system consisting of several segments of pipe (usually galvanized steel or aluminum) joined together and supported by trusses, mounted on wheeled towers with sprinklers positioned along its length. These machines move in a circular pattern (if center pivot) or linear and are fed with water from an outside source (i.e. a well or water line). The essential function of an irrigation machine is to apply an applicant (i.e. water or other solution) to a given location.

Traditionally, growers will map a field using field scouting, satellite, unmanned aerial vehicle (UAV) and/or micro air vehicle (MAV) images. Additionally, deployed irrigation machines and active sensors provide continual streams of data. Each of these monitored factors impact crop yields. Independent of these factors, growers are also affected by the cost of the goods and services needed for crop production (e.g. water, electricity, fertilizer). These costs continually change along with weather data and commodity pricing. Additionally, these factors can be affected by the detection of areas of crops needing chemical treatment.

At present, images and other types of sensor data are not integrated together to allow for the smart application of chemicals against detected diseases/pests within discrete sections of an irrigation field. Additionally, growers have limited options for physically treating small areas of a given field. Accordingly, most often entire irrigation platforms must be moved across a given field to treat even small areas of crops. Further, in these types of situations, growers have no actual awareness of the cost/benefits of applying a specific targeted treatment.

In order to overcome the limitations of the prior art, a system is needed which can effectively integrate, analyze and display data from different sources. Further, a system is needed which can provide actionable data analysis for growers to allow for the treatment of discrete areas of crops.

SUMMARY OF THE DISCLOSURE

To minimize the limitations found in the prior art, and to minimize other limitations that will be apparent upon the reading of the specifications, the present invention provides a system which includes elements to allow for the execution of irrigation and chemical spray patterns according to specific prescriptions for various identified crops.

According to preferred embodiments, the present invention preferably may determine specific prescriptions for targeted areas/plants within given irrigation areas and may execute/determine instructions to allow for selective applications of given prescriptions to specific areas or plants. According to preferred embodiments, the system may use imaging data in combination with other sensors and analysis modules to identify selected pests and diseases affecting given crops. Preferably, the system may use machine learning/AI modules to analyze the data and to provide targeted prescriptions for targeted groups of identified crops based on identified conditions of infestation and/or disease within the identified crops.

According to preferred embodiments, the range of prescriptions provided by the present system may include any one or more of: broad field applications; spot applications; pesticides; herbicides; broad spectrum defoliants; targeted and specific fungicides, biocides and the like. Additionally, the system of the present invention may also include mechanical elements which may be made part of any responsive remediation prescription. For example, the system may include elements for the mechanical destruction (e.g., cutting tools) and/or the use of a burner flame or the like to destroy unwanted weeds or diseased plants.

According to further preferred embodiments, one or more treatment devices for delivering a prescription may be mounted to the irrigation system and/or a given drone (e.g., a sprayer, spreader, burner flame, cutting device and/or the like). Any such treatment devices may preferably utilize their own chemical reservoirs to provide treatments.

According to further preferred embodiments, the irrigation system of the present invention may include ports or valves which may allow any treatment device/drone to receive chemicals for targeted applications. Likewise, the system may provide prescribed chemical mixtures to specific groups of sprayers as required for each targeted application.

These and other features of the present invention shall be discussed in further detail below.

DESCRIPTION OF THE PREFERRED EMBODIMENTS

Figure 1:
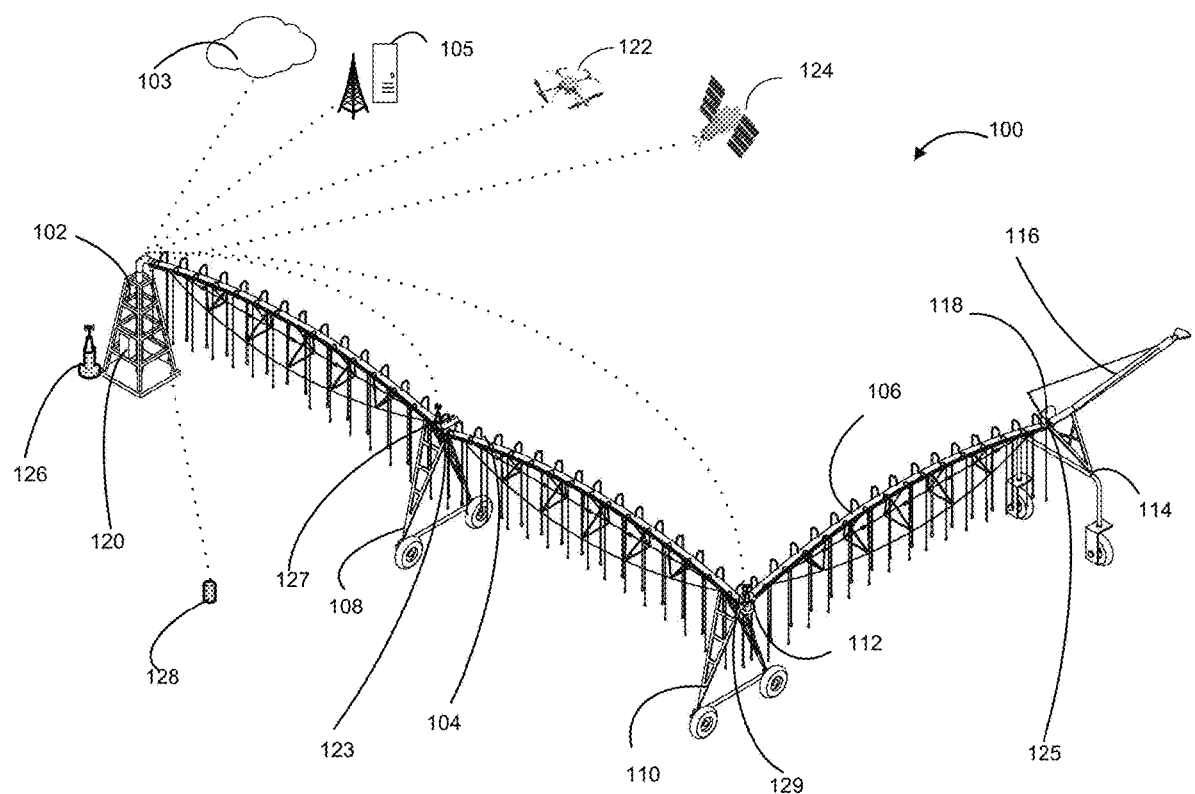
FIG. 1 shows an exemplary irrigation system in accordance with a first preferred embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art. The descriptions, embodiments and figures used are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to"), rather than the mandatory sense (i.e. meaning "must"). Further, it should also be understood that throughout this disclosure, unless logically required to be otherwise, where a process or method is shown or described, the steps of the method may be performed in any order (i.e., repetitively, iteratively or simultaneously) and selected steps may be omitted. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor to enable the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter.

The terms "program," "computer program," "software application," "module" and the like as used herein, are defined as a sequence of instructions designed for execution on a computer system. In addition, for each of the embodiments described herein, the corresponding form of any such embodiment may be described herein as, for example, "a computer configured to" perform the described action. Any such computer, program, computer program, module or software application may include a subroutine, a function, a procedure, an object implementation, an executable application, an applet, a servlet, a source code, an object code, a shared library, a dynamic load library and/or other sequence of instructions designed for execution on a computer system. A memory or data storage means, as defined herein, includes many different types of computer readable media including volatile storage such a RAM, buffers, cache memory, and network circuits.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc.

FIGS. 1-9 illustrate various configurations of irrigation systems which may be used with example implementations of the present invention. As should be understood, the irrigation systems shown in FIGS. 1-9 are exemplary systems onto which the features of the present invention may be integrated. Accordingly, FIGS. 1-9 are intended to be purely illustrative and any of a variety of systems (i.e. fixed systems as well as linear and center pivot self-propelled irrigation systems; stationary systems; corner systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way.

With reference now to FIG. 1, an exemplary irrigation machine 100 of the present invention preferably may include a main span 104, a center pivot structure 102 and supporting drive towers 108, 110. The exemplary irrigation machine 100 may also include a corner span 106 attached at a connection point 112. The corner span 106 may be supported and moved by a steerable drive unit 114. The corner span 106 may include a boom 116 and an end gun (not shown) and/or other sprayers. Additionally, a position sensor 118 is preferably provided to provide positional and angular orientation data for the system as discussed further below. Further, a central control panel 120 is provided for enclosing on-board computer elements such as elements of the exemplary control device 121 discussed below. The control panel 120 may also be linked to a transceiver for transmitting and receiving data between system elements, device/internet clouds 103, remote servers 105 and/or the like. In accordance with a further aspect of the present invention, the control panel 120 may be further linked to a remote sensing element such as a sensor suite located on an unmanned aerial vehicle 122 (UAV/drone) or a manned aerial vehicle (MAV). The system is preferably further designed to receive, and process sensor/image data provided by satellite 124 and other high-altitude monitoring systems.

Additionally, the system may include and/or receive data from remote sensors 128 which may provide in-situ soil data (e.g. moisture content) and/or crop related data. The system may also include image sensors 123, 125 which preferably may include sensors to indirectly determine the moisture levels in a given area of soil and/or optics to allow for the detection of crop type, stage of growth, health, presence of disease, rate of growth and the like. The system may also include a weather station 126 or the like to measure weather features such as humidity, pressure, precipitation, solar radiation, temperature and the like. Additionally, the system may include wireless transceivers/routers 127, 129 for receiving and transmitting signals between system elements. Preferably, the data collected by the detectors and sensors of the present invention may be forwarded to a main control panel 120 and control device 121. Alternatively, the received data may be collected and retransmitted to a remote server/cloud for processing and analysis as discussed further herein.

Figure 2:
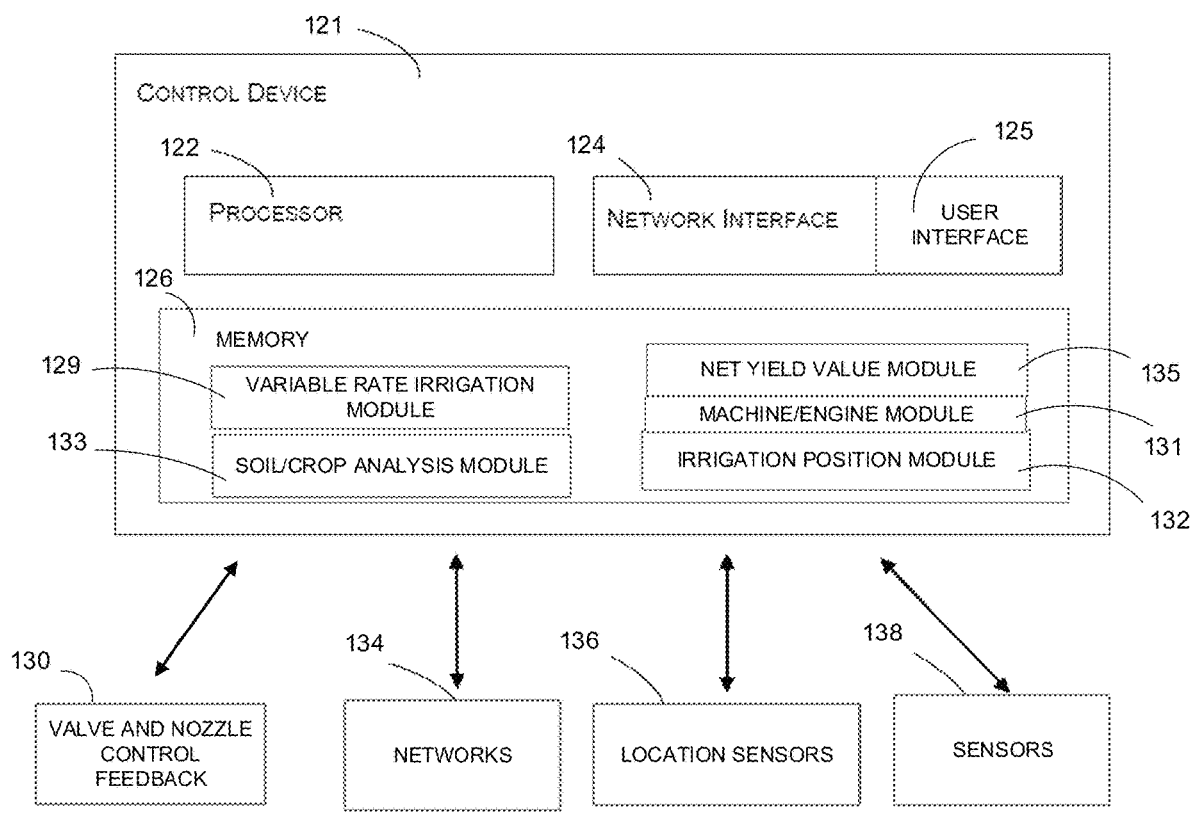
FIG. 2 shows an exemplary control system in accordance with a first preferred embodiment of the present invention.

With reference now to FIG. 2, an exemplary control device 121 which represents functionality to control one or more operational aspects of the irrigation system 100 will now be discussed. As shown, the exemplary control device 121 may include a processor 122, a memory 126 and a network interface 124. The processor 122 may provide processing functionality for the control device 121 and may include any number of processors, micro-controllers, or other processing systems. The processor 122 may execute and the memory 126 may store one or more software programs, as well as other data, to allow the processor 122 and other elements of the control device 121 to implement techniques described herein. The memory 126 may further provide storage for sets of instructions and modules such as, for example, a variable rate irrigation (VRI) module 129 to calculate and control the timing and disbursement of applicants through the irrigation system. The memory 126 may also include an irrigation positioning module 132 or the like to provide mapping and positional data to the system. The memory may also include a soil/crop analysis module 133 for analyzing soil and crop conditions as discussed further below. The memory may also include a machine/engine module 131 for receiving diagnostic and maintenance information via engine sensors, fuel sensors, OBD-II links and the like.

The control device 121 may also include a network interface 124 or the like to enable the control device 121 to communicate with one or more networks 134 through a variety of components both internal and external to the irrigation machine. The control device 121 may also include a user interface 125 which may be a physical screen and/or software accessible remotely. Preferably, the system includes one or more location detection devices 136 (e.g. GPS, LORAN, or the like) to provide location data. The system also preferably includes a valve and nozzle control/feedback system 130 to allow for control of irrigation elements and multiple inputs/outputs to receive data from sensors 138 and monitoring devices as discussed further below.

Preferably, the crop/soil analysis module 133 may combine and analyze image data, in-situ field data, and weather data to determine rates of crop growth and potential crop yields. As discussed further below, the on-board and remote imaging systems of the present invention may be used to selectively identify crop type, stage of growth, health, presence of disease, rate of growth and the like. According to a further preferred embodiment, imaging data may be processed and compared using vegetation indices such as but not limited to: RVI (ratio vegetation index), NDVI (normalized difference vegetation index), SAVI (soil-adjusted vegetation index), MASVI (modified soil-adjusted vegetation index) and RSR (reduced simple ratio index). The crop/soil analysis module 133 will preferably process, combine and evaluate the data collected from all sources, update the water balance and generate irrigation management recommendations. For example, the crop/soil analysis module 133 may receive field specific data of current field conditions and may preferably use the system's analytics to calculate crop water use, crop water stress index, plant production ratio and other indices. In addition, vegetation indices may preferably be calculated as checks against the values calculated from the aerial data and to provide information if cloud cover or other atmospheric interference is present. The crop/soil analysis module 133 and the net yield value module 135 (as discussed further below) may provide data to the VRI module 129 which may autonomously create and execute an irrigation plan which includes custom drive instructions and applicant dispersal rates for a given field as discussed further below. The processor 122 of the present invention may preferably interface with drive control and applicant pressure controls to execute the irrigation plan.

Figure 3:
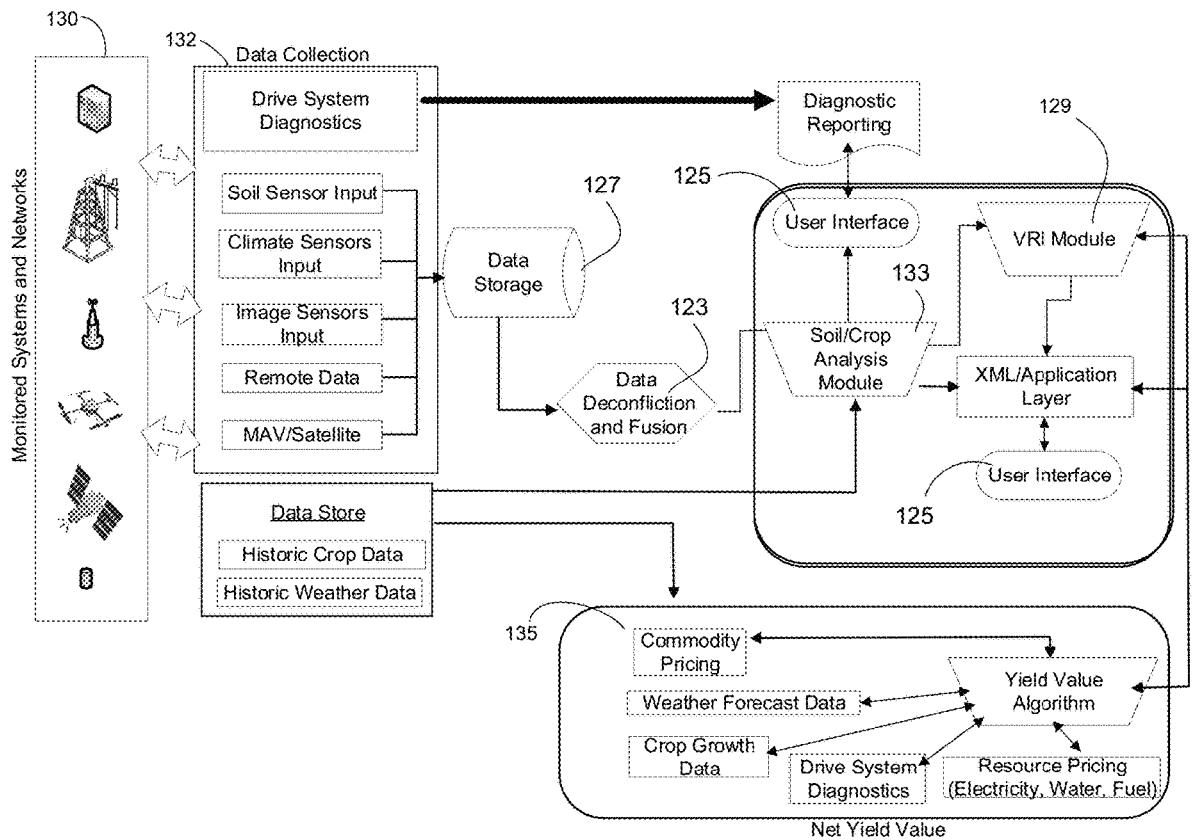
FIG. 3 shows a functional diagram illustrating an exemplary data flow for an exemplary embodiment of the present invention.

With reference now to FIGS. 3, a block diagram illustrating aspects of the present invention is shown. As shown, data and sensor systems 130 of the present invention preferably provide input signals to the data collection inputs 132 which are then preferably processed for analysis by the soil/crop analysis module 133. The output from the soil/crop analysis module 133 preferably may be accessed by the VRI module 129. The VRI module 129 may preferably receive data from the net yield value module 135 as discussed further below.

Figure 4:
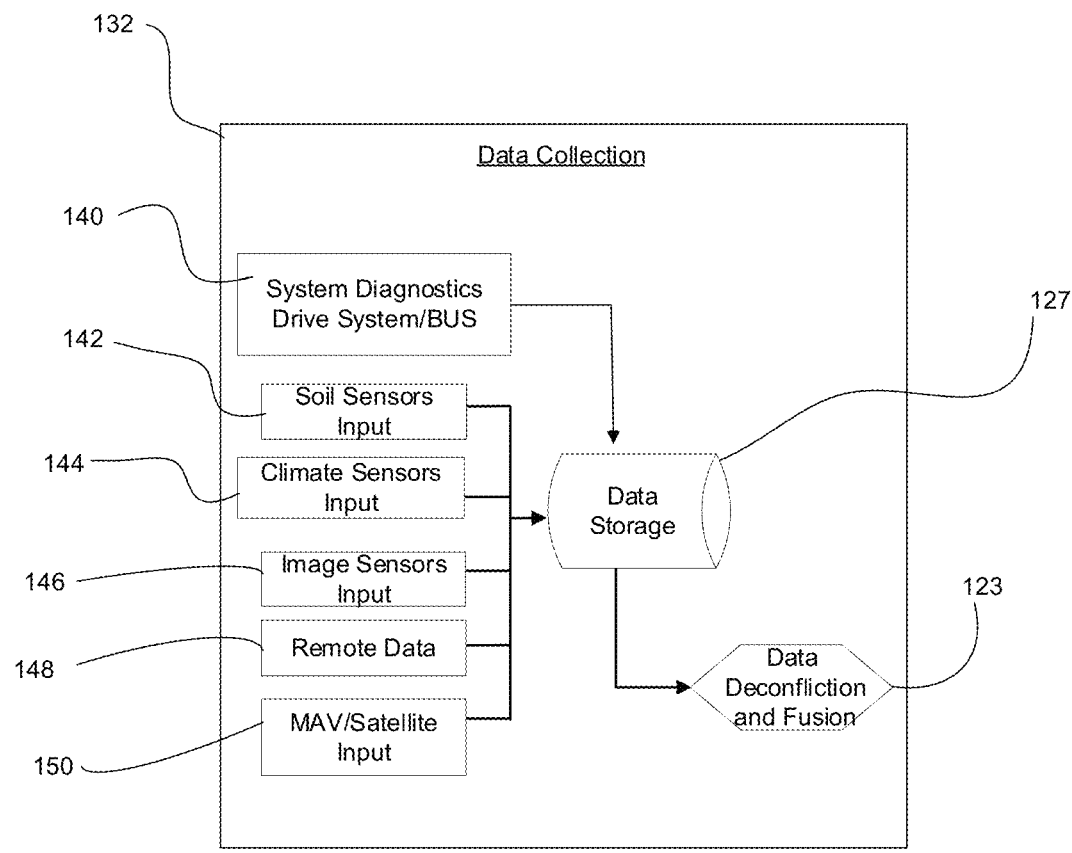
FIG. 4 shows a functional diagram illustrating an exemplary data collection system for the system shown in FIG. 3.

With reference now to FIG. 4, the input signals from the sensor systems are preferably received via a set of data collection inputs 132 and thereafter collected and stored in memory/data repository 127. The data sources may include: system diagnostic/BUS data 140; soil sensor inputs 142; climate sensor input 144; image sensor input 146; remote data inputs 148; and remote/MAV/satellite inputs 150. As data from each of the sources of the present invention may differ in format and data structure, the data is preferably transformed into a common format such as XML or other format so that the data can be subsequently mined, modeled and interpreted. According to a preferred embodiment, the data repository 127 preferably provides a common schema and archive for all sensor data in the system as well as for externally provided data along with any required input transformations, extended data dictionaries, and database designs that encompass all inputs. Since the data stored on the data repository 127 is obtained from a variety of tools, the data is preferably further processed to remove duplicated and/or conflicting data. This deconfliction of data is preferably resolved by a combination of data deconfliction methodologies such as rule based and machine learning tools which are provided via a data deconflicting engine 123 or the like.

Figure 7:
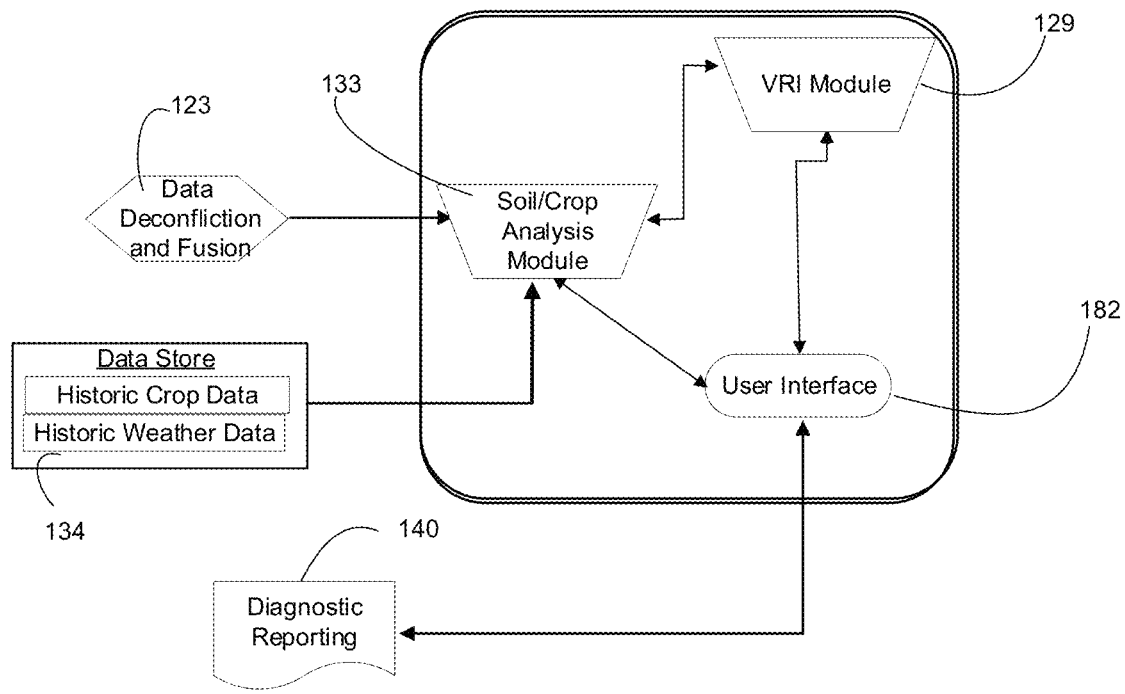
FIG. 7 shows a functional diagram illustrating a user interface and additional modules of the present invention.

As shown in FIG. 7, once deconflicted, the soil/crop analysis module 133 preferably extracts data from the data store 127 and fuses the data with historic crop/weather data 134 and other inputs. Preferably, data fusion is accomplished using several technologies which may include Dempster/Schaeffer, Bayesian classifiers, neural nets, parallel coordinates, genetic algorithms, AI techniques and other classification schemes. Once fused, the data may preferably be accessed and displayed via a user interface 125 along with VRI module 129 data and diagnostic data 140.

Figure 5:
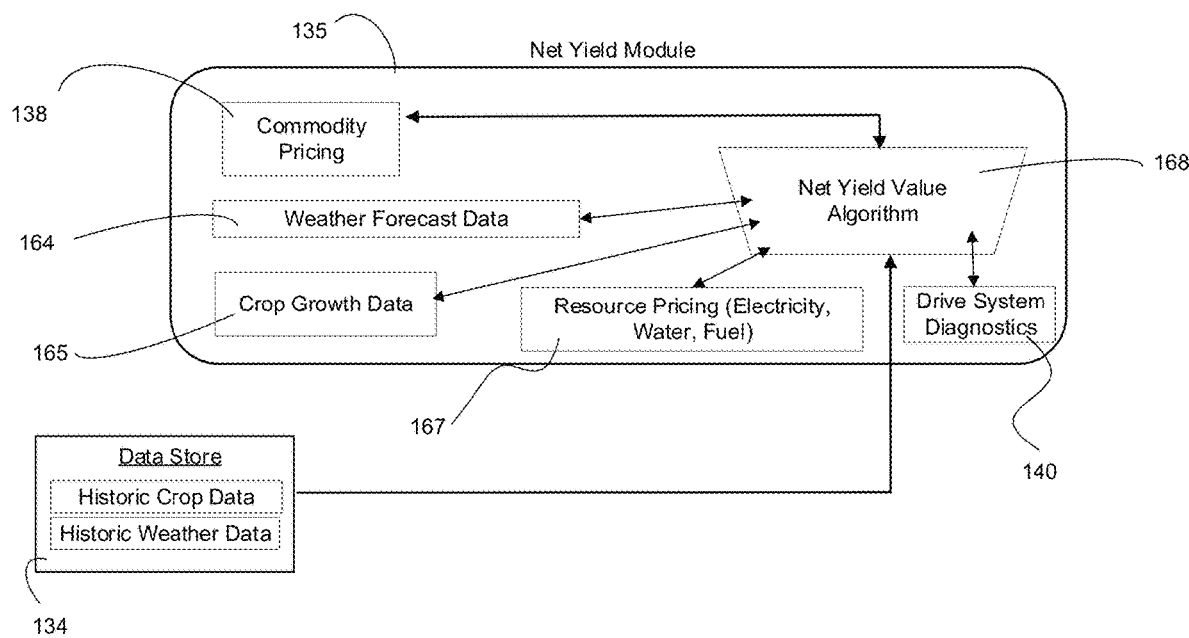
FIG. 5 shows a functional diagram illustrating an exemplary net yield module for the system shown in FIG. 3.
Figure 6:
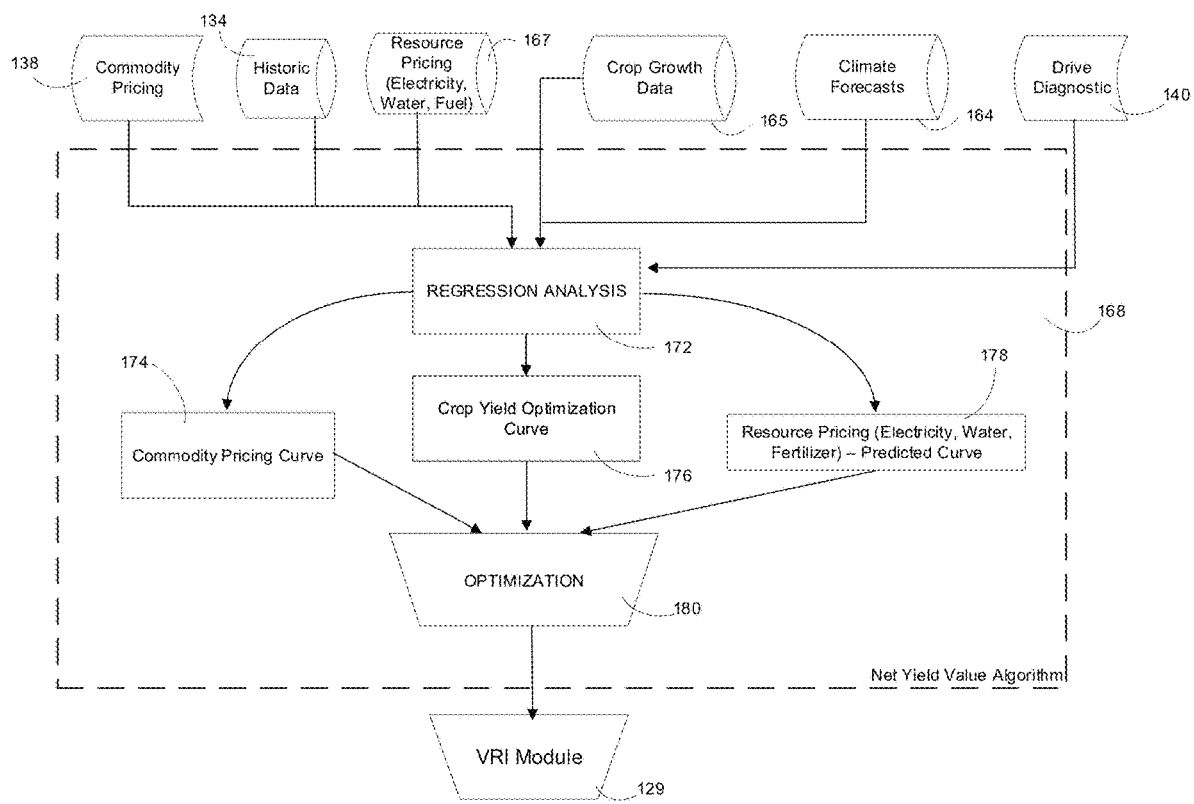
FIG. 6 shows a functional diagram illustrating a net production algorithm.

With reference now to FIGS. 5-6, the system may further include a net yield value module 135 which preferably operates to collect and analyze data related to crop health, crop growth rates, potential crop yields and operational costs. Example input variables may include: commodity pricing 138; weather data 164; crop growth data 165; resource pricing data 167; drive system data 140; and historic data 134. Preferably, the combination and analysis of data is continually processed and updated.

As shown in FIG. 6, the net yield value module 135 preferably analyzes the collected data using a net yield value algorithm 168 which includes several processing steps. According to a preferred embodiment, the net yield value algorithm 168 preferably processes the received data using regression analysis 172 to create models of future values for selected variables. According to a preferred embodiment, the models may include one or more commodity pricing curves 174, crop yield optimization curves 176 and resource pricing curves 178. These respective models preferably represent a projected set of future values for each variable over the course of a given growing season. Thereafter, the net yield value algorithm 168 preferably further applies mathematical optimization modeling 180 to the modeled curves to determine the optimal target crop yields, irrigation prescriptions and harvest scheduling. The optimization method used may include any mathematical optimization method without limitation. According to a preferred embodiment, artificial intelligence techniques may preferably be used such as evolutional algorithms or the like. The optimized target crop yields, irrigation prescriptions and harvest scheduling are then preferably transmitted or accessed by the VRI module 129 for use in developing a target irrigation prescription for a given area.

As shown in FIG. 7, data output from the soil/crop analysis module 133, the VRI module 129, and the vehicle diagnostic systems 140 are each accessible via a user interface 125. The output data is preferably modeled and made available for presentation in a dashboard display that is focused on graphical and mathematical visualization of the data. The user interface 125 preferably provides an interface through which data generated by the present invention is transformed into predefined or user selectable visual representations as discussed further below.

Figure 8:
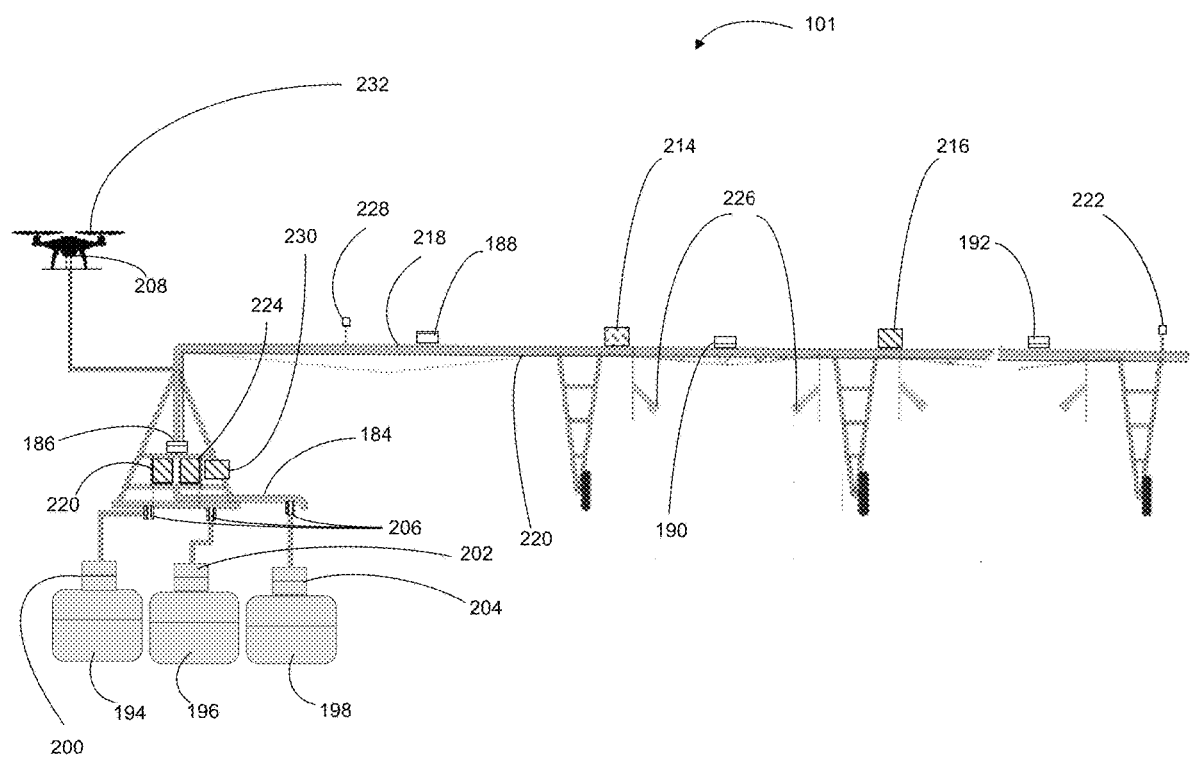
FIG. 8 shows a schematic diagram of an exemplary irrigation system in accordance with aspects of the present invention.

With reference now to FIG. 8, a schematic view of an embodiment of the exemplary system 101 incorporating further aspects of the present invention shall now be further discussed. As discussed above, the system 101 may preferably be attached to a water source 184 or the like to supply water or applicants under pressure to the irrigation system 101. Additionally, the system may preferably be able to receive water, chemicals and other applicants under pressure from a variety of tanks (or reservoirs) 194, 196, 198 which may preferably be selectively provided to the system 101 via individual injection pumps 200, 202, 204 and control valves 206. Preferably, the pumps 200, 202, 204 may be selectively controlled along with the individual valves 206 to control the input of chemicals and other applicants into the system. Preferably, the valves 206 may be non-return valves, reduced pressure backflow preventers or the like and may include solenoids to allow for the individual control of each valve. As further shown, an exemplary irrigation system 101 may include combinations of transducers 214, 216 and control valves 186, 188, 190, 192 which respectively monitor and control the water and/or chemical and/or applicant pressures delivered to sprayers within the system.

According to further preferred embodiments of the present invention, the water is preferably transported from the water source 184 to selective sprayers via a main span 218. Preferably, the main span 218 is fluidly separate from chemical supply lines 220 used to supply other applicants such as chemicals received from individual injection pumps 200, 202, 204. According to further preferred embodiments, the chemical supply lines 220 are preferably dedicated so that all the chemical pipes and chemical sprayers within the system are fluidly separate from the main water conveyance pipeline used by the irrigation sprinkler package. According to further preferred embodiments, brackets or other hanging devices (as discussed above) may attach the chemical transmission lines to selected water pipelines. Still further, the system preferably may be configured to allow for a complete flush/evacuation of dedicated chemical lines to purge conduits following a chemical application. According to further preferred embodiments, the dedicated chemical transmission lines and distribution sprayers/emitter/drops may preferably be formed of materials which are resistant to chemical and UV exposure.

According to preferred embodiments, the imaging data used by the system may be generated via a span mounted camera, drone 232, or other imaging source. Preferably, the drone 232 of the present system may be located near or mounted to the irrigation machine 101 as shown. As discussed above, any camera or other imaging sensors of the drone 232 or other sensors may be used in combination with any of the other sensors and/or analysis engines/modules disclosed herein to identify any pest or disease more specifically. As further discussed herein, the data collected by any of the imaging devices or other sensors within the system may be transmitted to and/or processed with a machine learning/AI module which may be used to further analyze the data and to provide targeted prescriptions for identified crops and identified conditions of infestation and/or disease within identified crops.

According to preferred embodiments, the range of prescriptions provided by the present system may include any one or more of: broad field applications; spot applications; pesticides; herbicides; broad spectrum defoliants; targeted and specific fungicides, biocides and the like. Additionally, the drone 232 and/or the irrigation machine 101 may also include mechanical elements which may be made part of any responsive remediation prescription. For example, the system may include elements for the mechanical destruction (e.g., cutting tools) and/or the use of a burner flame or the like to destroy unwanted weeds or diseased plants.

According to further preferred embodiments, one or more treatment devices for delivering a prescription may be mounted to the irrigation system and/or a given drone 232 (e.g., a sprayer, spreader, burner flame, cutting device and/or the like). Any such treatment devices may preferably utilize their own chemical reservoirs to provide treatments. The main irrigation system may also include ports or valves which may allow any treatment device/drone 232 to dock and receive chemicals stored by the main irrigation system. For example, the system of the present invention may enable elements (i.e., valves, pumps, regulators) of the chemical delivery system of the present invention to provide a chemical from a storage tank 194 (e.g., via an injection pump 200 and a control valve 206) to specific feeder lines 208 to supply the drone 232 with a prescribed chemical mixture to treat a given targeted area. Likewise, the system may provide the prescribed chemical mixture to specific groups of sprayers as required for each application as discussed above.

According to further preferred embodiments, the system of the present invention may further include rate control algorithms to prevent and/or track when specific crop areas do not receive the proper chemical applications for whatever reason (i.e., due to wind conditions, chemicals running out, improper cycling of emitters etc.). According to further preferred embodiments, sensors may be attached to specific spans and locally control adjoining drive units. Still further, the sensors of the present invention may be integrated into a larger system that operates and controls the entire irrigation system and/or individual ancillary devices (i.e., pump, power supply, etc.). Further these sensors may act in concert with other machine or field condition sensors via a central operational controller utilizing machine learning to control machine operations or to provide data for controlling other operational aspects of the irrigation machine.

Further, the system 101 of the present invention may preferably further include a controller 220 (as discussed above) as well as elements such as a GPS receiver 222 for receiving positional data and a flow meter 224 for monitoring water flow in the system. The controller 220 may include the VRI module 129 as discussed above. As further discussed above, the system may preferably include crop sensors 226 (e.g., soil, weather, imaging and other plant sensors) to allow for the detection of crop type, stage of growth, health, presence of disease, rate of growth and the like. The system may include one or more integrated sensor suite elements 228 which can include combinations of sensors and processing elements within a common housing. The system also may include a wireless transceiver/router 230 for receiving and transmitting signals between system elements as discussed above.

In operation, the controller 220 preferably includes software modules (e.g., the VRI module 129) to allow for the execution of irrigation and chemical spray patterns according to specific prescriptions for each crop or plant being sprayed as discussed above (e.g., as with controller 120 and control device 121). According to preferred embodiments, the controller 220 may determine specific prescriptions for target areas/plants within given irrigation areas (as discussed above). The controller 220 may preferably also generate, distribute and execute prescription instructions to allow for the selective application of given prescriptions to specific areas or plants by the various elements of the irrigation system 101. According to a preferred embodiment, the controller 220 may generate and distribute prescription instructions to ancillary devices (e.g., a drone 232) which may then independently execute the provided prescription instructions.

Figure 9:
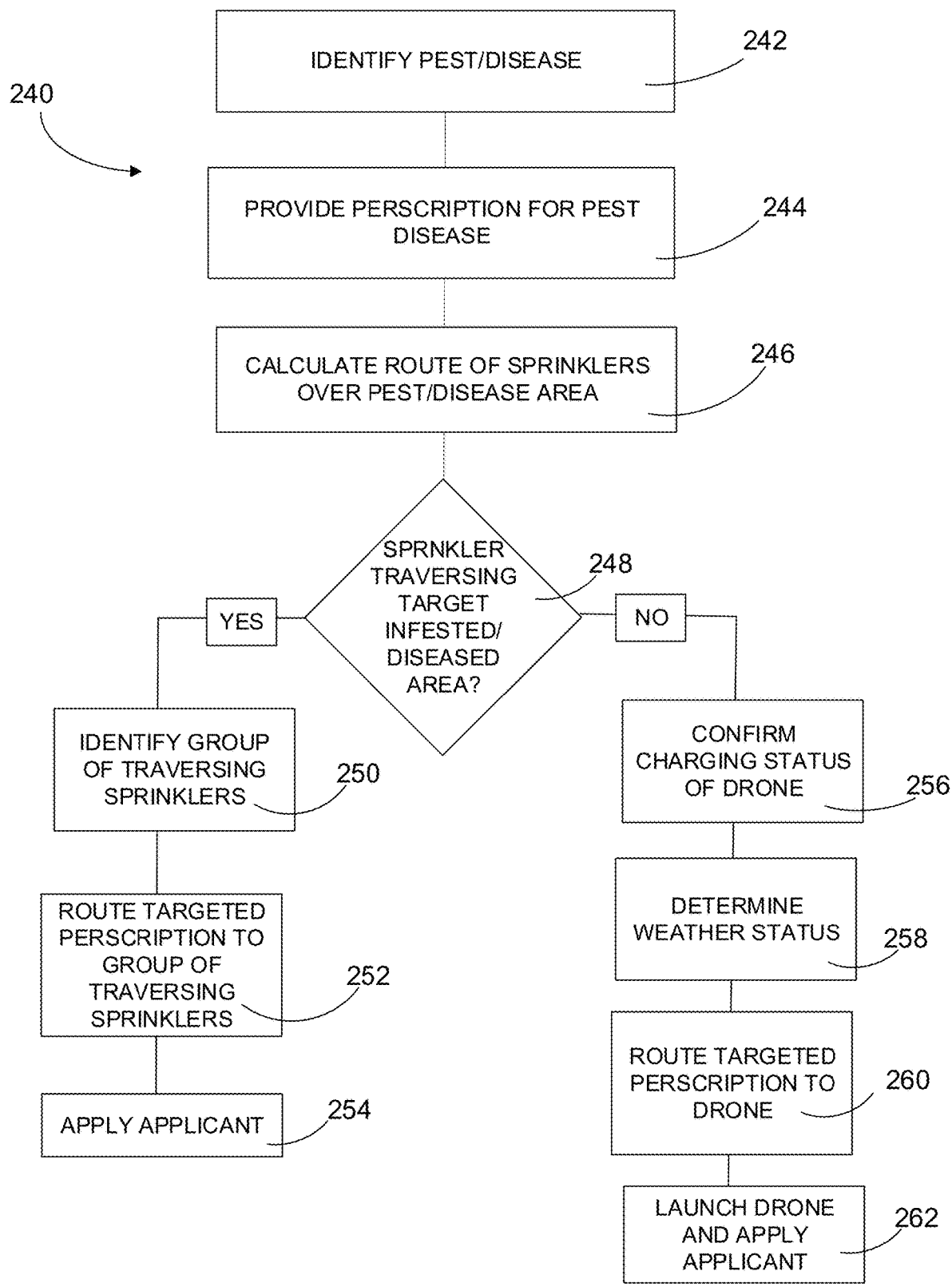
FIG. 9 is a flow chart illustrating exemplary method steps in accordance with further aspects of the present invention.

With reference now to FIG. 9, an exemplary method 240 shall now be discussed to illustrate additional aspects of the present invention. At a first step 242, the system may preferably receive imaging or other sensor inputs/data and may process the collected data to identify a given pest or disease within a given targeted area of a given field. At a next step 244, the system may then calculate, look up and/or otherwise match a chemical prescription to be applied to the identified pest/disease. At a next step 246, the system may preferably then calculate the route/path of one or more sprinklers within the system. At a next step 248, the system may determine whether a given sprinkler, nozzle or sprayer traverses over (i.e., within range to irrigate) a targeted area within the field. If YES, at a next step 250, the system may identify a group of traversing sprinklers. Thereafter, at next step 252, the system may route the targeted prescription of chemicals to the group of identified traversing sprinklers. At a next step 254, the system may then apply the targeted prescription to the target area.

If at step 248 the system determines that no irrigation element of the system traverses the targeted infested/diseased area (or that it would be impractical or undesirable to apply a chemical applicant/prescription through the main system), the system at step 256 may then proceed to initiate chemical delivery via a drone or the like. At step 258, the system may deploy the drone by first determining the weather status and confirming that selected weather parameters are within preset limits. At a next step 260, the system may then route a targeted prescription to the drone for application or otherwise confirm that the drone is currently loaded with the correct prescription. At a next step 262, the system may then launch the drone to apply the prescribed chemical.

The scope of the present invention should be determined not by the embodiments illustrated, but by the appended claims and their legal equivalents.

We claim:

1. A method for identifying crop status and applying irrigation prescriptions within a water delivery system, wherein the water delivery system is comprised of a primary conduit and a plurality of sprayers, the method comprising: receiving sensor inputs/data; wherein the sensor inputs comprise imaging data; processing the sensor inputs/data; identifying a first pest or a first disease within a first targeted area of a first field; calculating a first route for the irrigation system across the given field; identifying a first group of sprinklers traversing over the first targeted area; selecting a target prescription of chemicals for the first target area; wherein the step of selecting a target prescription comprises matching a stored chemical prescription with associated sensor inputs/data; wherein the stored target prescription and associated sensor inputs/data are stored in a look-up table; routing the targeted prescription of chemicals to the group of identified traversing sprinklers; applying the targeted prescription to the first target area; calculating one or more paths of a plurality of sprinklers for the first route of the irrigation system; identifying when the first targeted area falls within the irrigation range of one or more of the plurality of sprinklers during execution of the irrigation route; identifying when the application of a chemical applicant/prescription through at least one sprinkler to a second target area falls beneath a first efficiency parameter; and initiating a notification that the second target area is outside the irrigation range of the irrigation system.

2. The method of claim 1, wherein the method comprises the step of: initiating chemical delivery to the second target area via a drone.

3. The method of claim 2, wherein the method comprises the steps of: determining the weather status, and confirming that selected weather parameters are within preset limits for the chemical delivery of an applicant via the drone.

4. The method of claim 3, wherein the method comprises the step of: routing a second targeted prescription to the drone for application to the second target area.

5. The method of claim 4, wherein the step of routing the second targeted prescription to the drone comprises confirming that the drone is pre-loaded with the second targeted prescription.

6. A method for identifying crop status and applying irrigation prescriptions within a water delivery system, wherein the water delivery system is comprised of a primary conduit and a plurality of sprayers, the method comprising: receiving sensor inputs/data; processing the sensor inputs/data; identifying a first pest or a first disease within a first targeted area of a first field; calculating a first route for the irrigation system across the given field; identifying a first group of sprinklers traversing over the first targeted area; selecting a target prescription of chemicals for the first target area; routing the targeted prescription of chemicals to the group of identified traversing sprinklers; applying the targeted prescription to the first target area; combining and analyzing data selected from a first group of data; wherein the first group of data comprises: image data, in-situ field data, and weather data; determining a crop growth rate and crop yields for selected sections of a given field; determining crop status; wherein the crop status is determined at least in part from crop parameters selected from the group of crop parameters comprising: crop type, stage of growth, health, presence of disease, and rate of growth; calculating crop indices, wherein the crop indices are selected from the group of crop indices comprising: crop water use, crop water stress index, and plant production ratio; creating a first modified irrigation plan for a given target area within a given field which includes a first set of drive instructions and a first set of applicant dispersal rates which are determined at least in part based on the crop parameters and the crop indices; and executing the first modified irrigation plan; wherein the step of executing the first modified irrigation plan comprises interfacing with a drive control system and water pressure system.

7. The method of claim 6, wherein the data sources comprise data sources selected from the group of data sources comprising: irrigation system BUS, soil sensors; climate sensors, image sensors, remote data inputs, drones and satellites; wherein the crop status is determined at least in part from crop parameters selected from the group of crop parameters comprising: RVI (ratio vegetation index), NDVI (normalized difference vegetation index), SAVI (soil-adjusted vegetation index), MASVI (modified soil-adjusted vegetation index) and RSR (reduced simple ratio index).

8. The method of claim 7, wherein the method comprises: transforming data formats, storing the transformed data, and mining the stored transformed data.

9. The method of claim 8, wherein the method comprises deconflicting data to produce deconflicted data.

10. The method of claim 9, wherein the method further comprises:

extracting data from at least one data store; and fusing the extracted data with historic crop/weather data; wherein the fusion of data is preformed using techniques selected from the group of techniques comprising: Dempster/Schaeffer techniques, Bayesian classifiers, neural nets, parallel coordinates, genetic algorithms, and AI techniques.

11. The method of claim 10, wherein the method further comprises:

analyzing pricing data; wherein the pricing data comprises data selected from the group of data comprising: crop health data, crop growth rate data, potential crop yields; operation costs; commodity pricing; weather data; resource pricing data; and drive system data.

12. The method of claim 11, wherein the step of analyzing pricing data comprises performing regression analysis to create models of future values for selected variables; wherein the step of analyzing the pricing data further comprises calculation of commodity pricing curves, crop yield optimization curves and resource pricing curves; wherein the models of future values comprise a projected set of future values for selected variables over the course of a given growing season.

13. The method of claim 12, wherein the method further comprises: developing a target irrigation prescription for a given area; wherein the step of developing the target irrigation prescription comprises: calculating target crop yields, calculating irrigation prescriptions and calculating harvest scheduling.

14. The method of claim 13, wherein the method further comprises: providing a dashboard display of selected data.

* * * * *